May 29, 1923.
N. W. CUMMINS
LUBRICANT COMPRESSOR
Filed Feb. 2, 1921
1,456,973
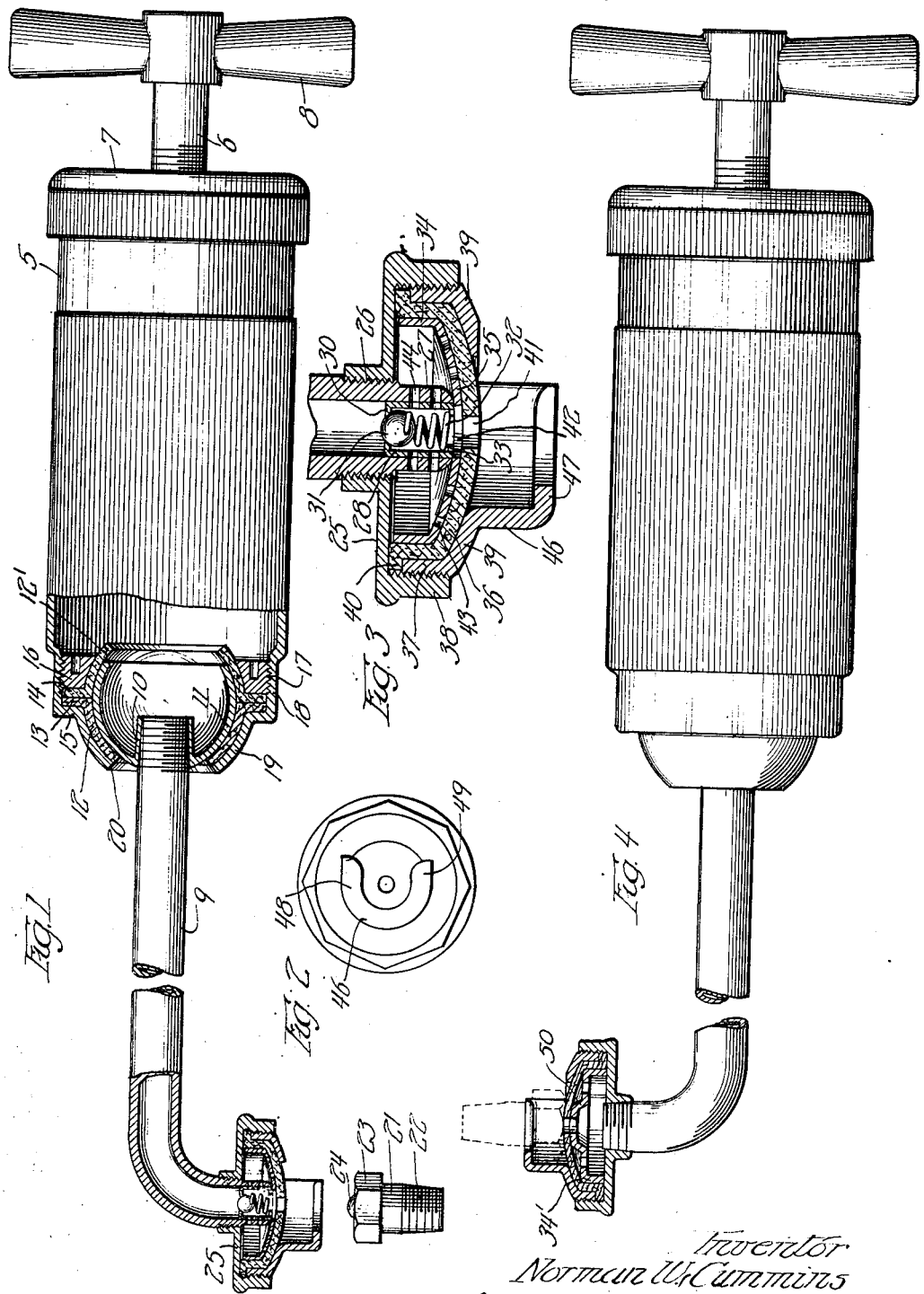

Patented May 29, 1923.

1,456,973

UNITED STATES PATENT OFFICE.

NORMAN W. CUMMINS, OF BRIDGEPORT, CONNECTICUT, ASSIGNOR TO THE BASSICK MANUFACTURING COMPANY, OF CHICAGO, ILLINOIS, A CORPORATION OF DELAWARE.

LUBRICANT COMPRESSOR.

Application filed February 2, 1921. Serial No. 441,743.

*To all whom it may concern:*

Be it known that I, NORMAN W. CUMMINS, a citizen of the United States, and resident of Bridgeport, in the county of Fairfield and State of Connecticut, have invented a certain new and useful Improvement in Lubricant Compressors, of which the following is a full, clear, concise, and exact description, reference being had to the accompanying drawings, forming a part of this specification.

My invention relates to improvements in lubricant compressors, and is particularly concerned with that type of lubricant compressor which comprises a suitable receptacle for lubricant, having a discharge conduit, the free end of which is provided with a coupling means adapted to be successively attached to, and detached from, a plurality of lubricant receiving members, secured to the various bearings to be lubricated. The lubricant receptacle is provided with means whereby the lubricant can be discharged therefrom through the discharge conduit, under very considerable pressure.

The objects of my invention are:

First: To provide a compressor of the type described, having a rigid discharge conduit, the free end of which carries a coupling member adapted to be successively attached to and detached from the lubricant receiving means secured to the various bearings.

Second: To provide a compressor of the type described, wherein the free end of the discharge conduit is bent at an angle thereto, thereby permitting the coupling member to be positioned in portions which have been difficult to reach by the means heretofore proposed.

Third: To provide a lubricant compressor, having a rigid discharge conduit, with a coupling member which will permit movement of the discharge conduit, not only in planes extending transversely of the lubricant receiving device, but also in different planes extending parallel therewith, thus permitting a certain amount of movement of the discharge conduit without destroying the sealed connection between the coupling member and the lubricant receiving device.

Fourth: To provide a lubricant compressor, comprising a lubricant receptacle and a discharge conduit connected therewith by a universally flexible joint, which will permit access to portions of a machine difficult of access.

Fifth: To provide a lubricant compressor with means for attaching and detaching a discharge conduit with a lubricant receiving device, said means comprising novel means for sealing the connection between the coupling member and the lubricant receiving device.

Sixth: To provide a lubricant compressor having a discharge conduit and a coupling member secured thereto, of such construction as to enable a connection to be made with a lubricant receiving device, without manually touching the coupling means.

Seventh: To provide a lubricant compressor comprising a discharge conduit, the free end of which is provided with a valve yieldingly held in closed position against the pressure of the lubricant, so as to prevent the escape of lubricant from the discharge conduit, due to the expansion of an air bubble in the lubricant, or other circumstances creating slight pressures in the discharge conduit, but so constructed as not to offer material resistance to the discharge of lubricant from the compressor; and Eighth: To provide a compressor of the character described, which is simple in construction, economical to manufacture, rugged, and easy to operate.

Other objects will appear as this description progresses, reference being had to the accompanying drawings, in which Figure 1 is a side elevation of my improved compressor, portions thereof being broken away to show certain details of construction;

Figure 2 is a bottom view of the coupling means;

Figure 3 is a central longitudinal section through my improved coupling means, taken on an enlarged scale, and Figure 4 is a side elevation of a lubricant compressor, embodying a slightly modified form of coupling means.

Throughout the several views, similar reference characters will be used for referring to similar parts.

Referring now to the drawings, my improved compressor comprises a suitable cylindrical barrel 5, having a screw-threaded piston rod 6, which extends through the cap 7, having threaded engagement with a suitable aperture in said cap, said piston rod being provided with a suitable handle 8. The inner end of the piston rod 6 carries a suitably formed piston, or plunger, (not shown) for exerting pressure upon the lubricant in the barrel 5, whenever the piston rod 6 is rotated in a proper direction.

The discharge conduit 9, which is preferably formed of rigid metal tubing, has one end screw-threaded into the inwardly extending boss 10 of the stamped metal spherical member 11, the inner side of which is open to communicate with the barrel 5, as shown in Figure 1. A pair of opposed gaskets 12 and 12′ formed of leather, rubber, or other suitable flexible material, and conformed to the outer surface of the spherical member 11, are provided at their adjacent edges with outwardly extending flanges 13 and 14, which are clamped between the inwardly extending shoulder 15, formed on the end of the barrel 5, and the bushing 16, the outer periphery of which is threaded to engage the threads 17 formed on the inwardly offset portion 18 of the barrel 5, and the inner periphery of which is conformed to clamp the gasket 12′ against the spherical surface of the member 11. The bushing 16 also tends to push the spherical member 11 outwardly against the spherical ring shaped extension 19 of the flange 15, which acts as a seat for the spherical member 11, and the gasket 12, and retains the spherical member 11 in position against the pressure developed on the lubricant in the cylinder 5.

From the above description, it will be clear that the means just described provide a universally flexible connection between the discharge conduit 9, and the compressor barrel 5. It will also be apparent that the inner edge 20 of the ring 19 acts as an abutment to limit the movement of the discharge conduit 9 relatively to the compressor barrel.

The compressor thus far described is designed to be used for supplying lubricant to lubricant receiving means, comprising a tubular member 21, one end of which is screw-threaded, as shown at 22, to be secured to a bearing, and the other end of which is provided with a head 23, having an inlet opening, which is preferably closed by a closure 24. Ordinarily, the closure 24 is held in its closed position by a spring, not shown. The details of construction of the lubricant receiving member form no part of my present invention, and the illustration is merely conventional. Since constructions of this and similar types are well known, it is unnecessary to further describe the same.

For the means which I provide for establishing a quickly attachable and detachable connection between the lubricant receiving member, just described, and the discharge conduit of my improved compressor, I provide coupling means comprising a cap 25, which is secured to the end of the conduit 9, preferably by means of screw threads 26, (see Fig. 3), the outer end of the conduit being reduced in cross-section for a short distance, so that it projects into the cap 25, as shown at 27. A cup 28 is inserted in the open end of the conduit 9. The bottom of the cup is apertured to provide a valve seat 30 against which the valve 31 is held by the pressure of a coiled spring 32, the outer edge of the cup having lugs bent inwardly, as shown at 33, to provide an abutment for the outer end of the spring 32. The tension of the spring 32 is sufficient to prevent the escape of lubricant from the conduit under slight pressure, such as might be caused by the expansion of an air bubble in the lubricant, or other circumstances. This tension is not, however, sufficient to offer any material resistance to the discharge of lubricant from the compressor, when it is desired to supply lubricant to a bearing. A cup 34 having an outwardly convex bottom 35, is positioned to have the cap with the inside of the bottom in contact with the end of the discharge conduit 9. I then provide a gasket 36, of leather, rubber, or other suitable flexible material, which conforms to the shape of the cup 34, and covers the outer side of the bottom thereof. For securing the cup 34 and the gasket 36 in position, I provide a collar 37, which has screw-threaded engagement with the flange 38 of the cap 25. This collar is provided with an inwardly extending flange 39, which clamps the gasket tightly between it and the cup 34. The inner end of the collar 37 also clamps the outwardly turned edge 40 of the gasket against the top of the cap 25, so that the gasket is securely retained between the cap and the collar. The gasket 36 is provided with a centrally disposed aperture 41, which registers with the corresponding, but larger, aperture 42, formed in the bottom of the cup 34, and these apertures, in turn, communicate with the bore of the conduit 9. Other apertures 43, are formed from the bottom of the cup 34, and, in combination with the openings 44, formed in the sides of the extended portion 27 of the conduit 9, and the side walls of the cup 28, provide means for communicating the pressure of the lubricant to the inner side of the gasket 36, for a purpose about to be described.

The flange 39 of the collar 37 has a substantially semi-cylindrical extension 46, which is provided with an in-turned flange 47, forming a bifurcation adapted to straddle the tubular portion 21 of the lubricant receiving device, abutting against the lower side of the head 23.

I shall now describe the method of using the compressor described above. Assuming the barrel 5 of the compressor to be filled with a suitable lubricant, the operator grasps the barrel 5 in one hand, and the discharge conduit 9 in the other hand, and manipulates the discharge conduit to bring the head 23 of the lubricant receiving device between the bifurcations 48 and 49, and then by pulling upon either the barrel 5 or the discharge conduit 9, or both, these bifurcations are brought beneath the lower side of the head 23 with the bifurcations straddling the tubular portion 21 of the lubricant receiving device.

The operator then shifts one hand to the barrel 5, and the other hand to the handle 8, and manipulates the latter to place pressure upon the lubricant in the barrel 5. The resistance of the spring holding the closure 24 in its closed position, and the resistance of the bearing to the flow of lubricant therethrough, will cause the lubricant to initially flow out through the openings 44 into the cup 34, and into the opening 43, thereby causing an initial pressure upon the rear side of the gasket 36, which forces it against the end of the head 23, and into sealed relation therewith. As the pressure on the lubricant is increased, this pressure likewise increases, so that the greater the pressure which is required to overcome the resistance of the bearing, the tighter will be the seal between the coupling and the lubricant receiving device. When a suitable quantity of lubricant has been supplied to the bearing, the handle 8 is manipulated to relieve the pressure on the lubricant in the compressor barrel, and, at the same time, the valve 31, which has previously been forced from its seat by the pressure of the lubricant, returns under the influence of the spring 32 to its closed position. The coupling member is then disconnected from the lubricant receiving member by the reverse of the operations described above for connecting it thereto.

It will be noted from an inspection of Figure 1 that the free end of the discharge conduit, which carries the coupling member, is bent at an angle thereto. By this construction, the operator is enabled to make a connection with lubricant receiving devices, which may lie behind other portions of the machine, and would otherwise be inaccessible. Furthermore, it enables the slot of the bifurcated portion to open in any direction, as the operator can either push or pull upon the rigid discharge conduit, or move it from side to side to make connection with a lubricant receiving device.

It is practically impossible to operate the lubricant compressor to exert any considerable pressure upon the lubricant without moving the compressor barrel so as to cause movement of the discharge conduit, not only in planes extending transversely of the lubricant receiving device, but also in planes extending parallel therewith. By making the bottom of the cup convexed outwardly, and similarly conforming the gasket, and by making the distance between the in-turned flange 47 of the bifurcated portion of the coupling, and the outer face of the gasket, but very slightly larger than the thickness of the head 23 of the lubricant receiving device, I, in effect, provide a freely adjustable universal joint, which permits a limited, but universal, movement of the rigid discharge conduit 9. This movement is sufficient to prevent any injury either to the lubricant receiving device or portions of the compressor. The movement, however, is not sufficient to bring the discharge orifice 41 of the gasket out of registry with the intake port, or opening, of the lubricant receiving device. At the same time, the gasket will be sufficiently yielding to maintain under the pressure of the lubricant a tight seal with the end of the lubricant receiving device.

By providing a universal connection between the compressor barrel, and its discharge conduit, it makes possible access to otherwise inaccessible bearings.

It should be noted that the construction of the universal joint, connecting the discharge conduit 9 with the barrel of the lubricant compressor, is such that the pressure developed in the lubricant tends to force the spherical member 11 outwardly against the gasket 12, and thus automatically increase the sealing effect as the pressure on the lubricant increases.

In Figure 4, I have shown a modified form of my invention, in which the cup 28, the valve 31, its spring 32, and the extension 27 of the discharge conduit are omitted, and the lubricant discharges directly into the cup 34'. The bottom of the cup 34' is formed somewhat differently from that of the cup 34, in that it has a centrally disposed outwardly extending boss 50, the outer surface of which is convexed in the same manner that the bottom of the cup 34 is convexed. Otherwise, the construction shown in this figure is substantially identical with that shown in Figures 1 to 3 inclusive.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A lubricant compressor comprising a lubricant receptacle, a rigid discharge conduit having one end connected to said lubricant receptacle by a universally flexible joint, and other end of said conduit being bent at an angle thereto, and having a coupling member comprising a cap rigidly secured to said last-mentioned end, a collar threaded onto the open end of said cap and having an in-turned flange, a cup surrounding the open end of said conduit and having an outwardly convexed bottom, a gasket conforming to the bottom of said cup and having its edges confined between said flange and the bottom of said cup, said cup and gasket being provided with centrally disposed apertures communicating with said conduit, the last-mentioned end of said conduit and the bottom of said cup being provided with apertures to transmitting the pressure of the lubricant to the inner side of said gasket, and a bifurcated extension projecting from said collar transversely of said conduit, and in spaced relation to said gasket.

2. A lubricant compressor comprising a lubricant receptacle, a rigid discharge conduit having one end connected to said lubricant receptacle by a flexible joint, the other end of said conduit being bent at an angle thereto, and having a coupling member comprising a cap rigidly secured to said last-mentioned end, a collar threaded onto the open end of said cap and having an in-turned flange, a cup secured over the open end of said conduit and having an outwardly convexed bottom, a gasket conforming to the bottom of said cup and having its edges confined between said flange and said cup, said cup and gasket being provided with apertures communicating with said conduit, the last-mentioned end of said conduit and the bottom of said cup being provided with apertures for transmitting the pressure of the lubricant to the inner side of said gasket, and a bifurcated extension projecting from said collar transversely of said conduit, and in spaced relation to said gasket.

3. A lubricant compressor comprising a lubricant receptacle, a rigid discharge conduit having one end connected to said lubricant receptacle by a flexible joint, the other end of said conduit being bent at an angle thereto, and having a coupling member comprising a cap rigidly secured to said last-mentioned end, a collar threaded onto the open end of said cap, a cup secured over the open end of said conduit and having an outwardly convexed bottom, a gasket conforming to the bottom of said cup and having its edges confined between said cap and said cup, said cup and gasket being provided with apertures communicating with said conduit, the last-mentioned end of said conduit and the bottom of said cup being provided with apertures for transmitting the pressure of the lubricant to the inner side of said gasket, and means for establishing a detachable connection with a lubricant receiving device.

4. A lubricant compressor comprising a lubricant receptacle, a rigid discharge conduit having one end connected to said lubricant receptacle by a flexible joint, the other end of said conduit being bent at an angle thereto, and having a coupling member comprising a cap rigidly secured to said last-mentioned end, a collar threaded onto the open end of said cap, a cup secured over the open end of said conduit and having an outwardly convexed bottom, a gasket conforming to the bottom of said cup and having its edges confined between said cap and said cup, said cup and gasket being provided with apertures communicating with said conduit, and means for establishing a detachable connection with a lubricant receiving device.

5. A lubricant compressor comprising a lubricant receptacle, a rigid discharge conduit having one end connected to said lubricant receptacle by a flexible joint, the other end of said conduit being bent at an angle thereto, and having a coupling member comprising a cap rigidly secured to said last-mentioned end, a collar threaded onto the open end of said cap, a cup having a curved bottom secured over the open end of said conduit and a gasket having its edges confined between said cap and said cup, said cup and gasket being provided with apertures communicating with said conduit, the last-mentioned end of said conduit and the bottom of said cup being provided with apertures for transmitting the pressure of the lubricant to the inner side of said gasket, and means for establishing a detachable connection with a lubricant receiving device.

6. A lubricant compressor comprising a lubricant receptacle, a rigid discharge conduit, having one end connected to said lubricant receptacle by a flexible joint, the other end of said conduit having a coupling member comprising a cap secured to said last mentioned end, a collar threaded onto the open end of said cap, a cup secured over the open end of said conduit, a gasket covering a portion of the bottom of said cup, said cup and gasket being provided with apertures communicating with said conduit, and means for establishing a flexible detachable connection with a lubricant receiving device.

7. A lubricant compressor comprising a lubricant receptacle, a discharge conduit having one end connected to said lubricant receptacle by a flexible joint, the other end of said conduit having a coupling member comprising a cap secured to said last mentioned end, a cup having a curved bottom secured over the open end of said conduit, the open end of said cup being closed by said cap, a gasket covering a portion of the bottom of said cup, said cup and gasket being provided with apertures communicating with said conduit, and means for establishing a detachable connection with a lubricant receiving device.

8. A lubricant compressor comprising a lubricant receptacle, a discharge conduit having one end connected to said lubricant receptacle, the other end of said conduit having a coupling member comprising a cap secured to said last mentioned end, a cup secured over the open end of said conduit, the open end of said cup being closed by said cap, a gasket covering a portion of the bottom of said cup, said cup and gasket being provided with apertures communicating with said conduit, and means for establishing a flexible detachable connection with a lubricant receiving device.

9. A lubricant compressor comprising a lubricant receptacle, a rigid discharge conduit having one end connected to said receptacle by a universally flexible joint, the other end of said conduit being bent at an angle thereto, and having a coupling member comprising a cup in communication with said last mentioned end of said conduit, and having an outwardly convexed bottom, a gasket covering the bottom of said cup, said cup and gasket being provided with registering apertures communicating with said conduit, and means for establishing a quick detachable connection with a lubricant receiving device.

10. A lubricant compressor comprising a lubricant receptacle, a discharge conduit having one end connected to said receptacle by a flexible joint, the other end of said conduit being bent at an angle thereto, and having a coupling member comprising a cup in communication with said last-mentioned end of said conduit, and having an outwardly convexed bottom, a gasket covering the bottom of said cup, said cup and gasket being provided with registering apertures communicating with said conduit, and means for establishing a quick detachable connection with a lubricant receiving device.

11. A lubricant compressor comprising a lubricant receptacle, a rigid discharge conduit having one end connected to said receptacle, and having a coupling member comprising a cup in communication with said last-mentioned end of said conduit, and having an outwardly convexed bottom, a gasket covering the bottom of said cup, said cup and gasket being provided with registering apertures communicating with said conduit, and means for establishing a quick, detachable connection with a lubricant receiving device.

12. A lubricant compressor comprising a lubricant receptacle, a rigid discharge conduit having one end connected to said receptacle, and having a coupling member comprising a cup in communication with said last-mentioned end of said conduit, a gasket covering the bottom of said cup, said cup and gasket being provided with registering apertures communicating with said conduit, and means for establishing a flexible quick detachable connection with a lubricant receiving device.

13. A lubricant compressor having a rigid discharge conduit, the free end of which is provided with means forming a chamber, one side of which has an outwardly convexed portion provided with a discharge orifice, a gasket covering said outwardly convexed portion and conforming thereto, said gasket having an orifice communicating with said discharge orifice, and means for establishing a quick detachable connection with a lubricant receiving device.

14. A lubricant compressor having a discharge conduit, the free end of which is provided with means forming a chamber, one side of which is provided with a discharge orifice, a gasket covering said side, said gasket having an orifice communicating with said discharge orifice, and means for establishing a flexible quick, detachable connection with a lubricant receiving device.

15. A lubricant compressor having a discharge conduit, means forming a chamber at the free end of said conduit, said chamber having an outwardly convexed face provided with a discharge orifice, a gasket secured over said face and having an orifice communicating with said discharge orifice, and means for establishing a detachable connection with a lubricant receiving device.

16. A lubricant compressor having a discharge conduit, means forming a chamber at the free end of said conduit, said chamber having a face provided with a discharge orifice, a gasket secured over said face and having an orifice communicating with said discharge orifice, and means for establishing a detachable connection with a lubricant receiving device.

17. A lubricant compressor having a rigid discharge conduit connected therewith by a universally flexible joint, the free end of said conduit being bent at an angle thereto, and having a coupling member secured thereto for making a quick detachable connection with a lubricant receiving device.

18. A lubricant compressor having a rigid discharge conduit connected therewith by a universally flexible joint, the free end of said conduit having a coupling member secured thereto for making a quick, detachable connection with a lubricant receiving device, by a movement of said coupling in the direction of the axis of said conduit.

19. A lubricant compressor having a discharge conduit, a cup inserted in the free end of said conduit, the bottom of said cup being apertured to provide a valve seat, a valve, and a spring for yieldingly holding said valve on said seat against pressure of the lubricant in said conduit, the outer edge of said cup being flanged inwardly to form an abutment for the outer end of said spring.

In witness whereof, I hereunto subscribe my name this 27th day of January, 1921.

NORMAN W. CUMMINS.

Witnesses:
EDNA V. GUSTAFSON,
E. J. BOURGEOIS.